UNITED STATES PATENT OFFICE.

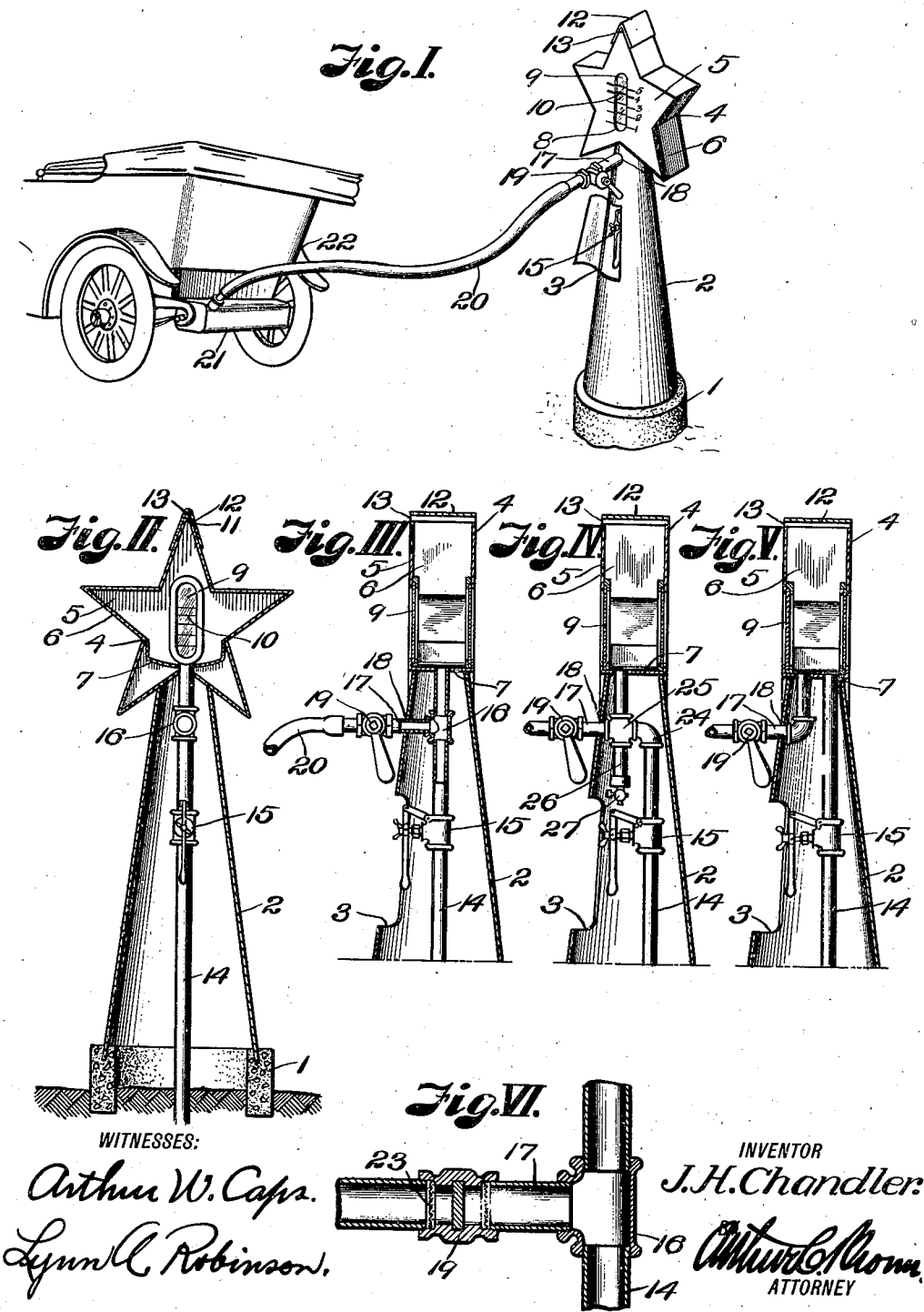

JOSEPH H. CHANDLER, OF KANSAS CITY, MISSOURI.

FLUID-DISPENSING APPARATUS.

1,185,768.  Specification of Letters Patent.  Patented June 6, 1916.

Application filed June 27, 1914. Serial No. 847,671.

*To all whom it may concern:*

Be it known that I, JOSEPH H. CHANDLER, a citizen of the United States, residing at Kansas City, in the county of Jackson and State of Missouri, have invented certain new and useful Improvements in Fluid-Dispensing Apparatus; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to fluid dispensing apparatus, and more particularly to an apparatus for measuring and delivering gasolene to motor cars; the principal object of the invention being to provide a device which may be conveniently located on the floor or in the yard of a gasolene service station, so that a person may drive his car near the apparatus, purchase a supply of fuel and have it delivered directly into the tank of his car, without coming in contact with dust or other foreign matter in the air. In accomplishing this object, I have provided the improved details of structure hereinafter described and illustrated in the accompanying drawings, wherein:

Figure I is a perspective view of a dispensing apparatus constructed in accordance with my invention and indicating its use in connection with an automobile of ordinary construction. Fig. II is a central vertical section of the dispenser. Fig. III is a vertical section of the device taken at right angles to that shown in Fig. II. Fig. IV is a similar view showing a modified form of piping, including a trap for collecting water or sediment which may be carried into the measuring tank. Fig. V is a similar view of another modified form of the device, showing both the intake and outlet pipes connected directly to the measuring tank. Fig. VI is a sectional detail view of a portion of the piping showing the location of strainers therein.

Referring more in detail to the parts: 1 designates a base, which may be composed of any suitable material, but here shown as consisting of concrete and located in an open yard. Rigidly supported on the base 1 is a hollow standard 2 having a side door 3, and supported on said standard is a measuring tank 4, comprising spaced side members 5, a connecting web 6 and an interiorly disposed base member 7. The tank 4 is preferably made in some irregular ornamental or unusual shape, so as to attract the attention of possible customers. The side members are located comparatively close together and are provided with elongated, registering apertures 8 which are covered with glass plates 9, bearing markings 10 on the outside that designate the number of gallons of gasolene in the tank, and which are spaced to correspond to the configuration of the tank. Opening from the top of the measuring tank is a vent aperture 11, which is covered by a cap 12 so as to provide apertures 13 at each side and thereby effectually relieve the tank of air and prevent the entrance of foreign matter.

Projecting through the base of the tank and through the interior base member 6 is a supply pipe 14, which leads from any suitable source of supply, such as a pressure or gravity tank (not shown), and which is provided with a straight-way valve 15 that may be manually operated through the door 3 in the standard. Located in the supply pipe 14, between the valve 15 and the measuring tank, is a T 16, having a service pipe 17 which projects through an aperture 18 in the standard 2 and which is provided with a straight-way valve 19 and a flexible hose 20 that is of sufficient length to reach the gasolene tank 21 of an automobile 22. Interposed in the service pipe 17, on each side of the valve 19, are screens 23 which may be of wire mesh, silk or chamois, or any suitable material for preventing foreign matter entering the tank of the car.

In the modification of the device shown in Fig. IV, the supply pipe 14 is provided with an L 24 which enters a cross 25 from one side and continues upwardly into the measuring tank. The service pipe leads from the cross opposite the supply pipe 14 and from the base of the cross projects a trap 26, into which water or sediment from the tank may collect and from which the same may be drawn off through a cock 27.

Fig. V shows the apparatus constructed so that the supply pipe and service pipe both connect directly with the measuring tank.

In using the device, presuming the parts to be constructed and assembled as described, with the valves closed and a car waiting to receive a supply of fuel, the hose 20 is first inserted into the tank of the automobile and the valve 15 opened to permit the gasolene to flow into the measuring tank 4 to the level of the proper graduation on the glass 9.
When the required amount of fluid has entered the chamber, the valve 15 is closed and the valve 19 opened to permit the fuel to flow, by gravity, into the receiving tank. It is apparent that as the fuel is flowing into the measuring tank, the purchaser may see the exact amount he is getting and can observe its quality through the registering apertures 8. It is also apparent that should there be water or sediment in the gasolene, it will quickly settle to the bottom and into the trap 26, from which it may be drawn off through the cock 27.

Having thus described my invention, what I claim as new therein, and desire to secure by Letters-Patent, is:

In a liquid dispensing apparatus, the combination with a base member, of a tubular standard on said base member, having a side door, a measuring tank on said tubular standard having registering sight openings, a glass plate covering each opening, graduations on said glass plates, a supply conduit extending through said tubular standard and connected directly to said tank, a valve in said conduit within the standard opposite said standard door, a service pipe connected directly with said supply conduit within the standard and projecting through the standard above the standard door, a valve in said service pipe outside of the standard, and a flexible connection on said service pipe.

In testimony whereof I affix my signature in presence of two witnesses.

JOSEPH H. CHANDLER.

Witnesses:
LYNN A. ROBINSON,
LETA E. COATS.